Aug. 11, 1942.　　　S. P. LOVELL　　　2,292,531
CAST-FORMING MATERIAL
Filed Oct. 2, 1940
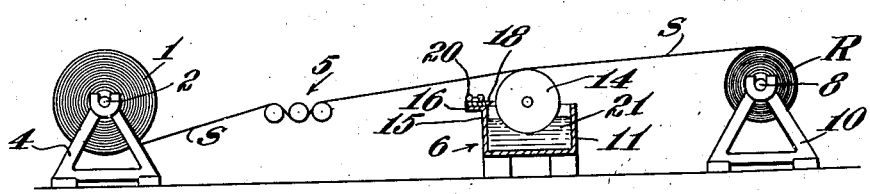
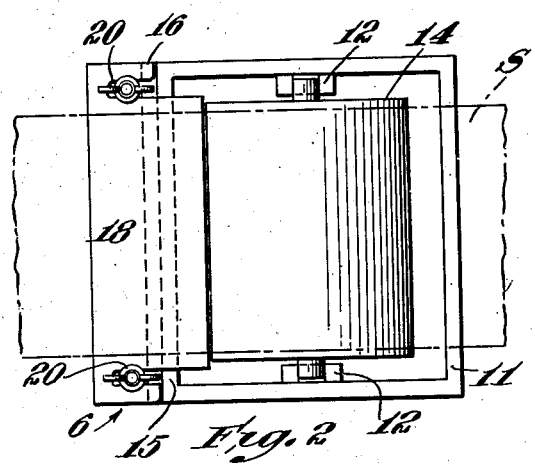
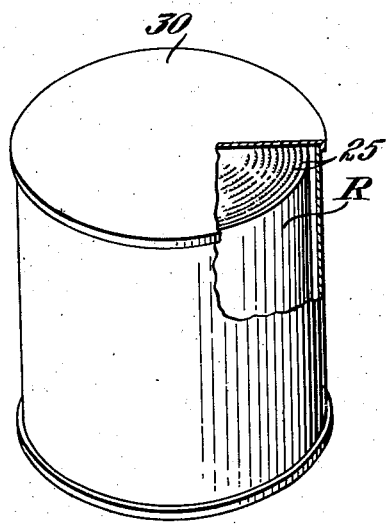
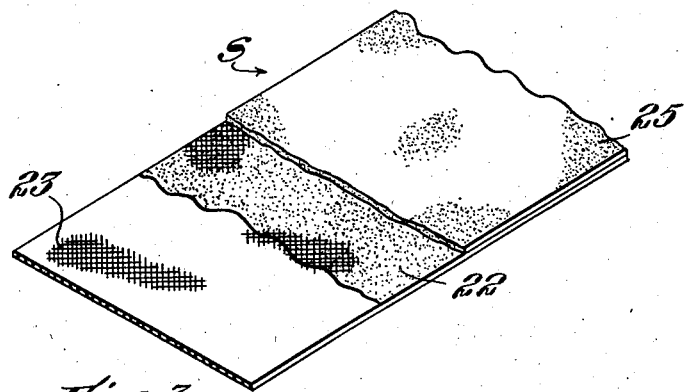
Inventor
Stanley P. Lovell
by Roberts Cushman & Woodbury
attys.

Patented Aug. 11, 1942

2,292,531

UNITED STATES PATENT OFFICE 2,292,531

CAST-FORMING MATERIAL

Stanley P. Lovell, Newton, Mass., assignor to Castex Laboratories, Inc., Watertown, Mass., a corporation of Massachusetts Application October 2, 1940, Serial No. 359,333

8 Claims. (Cl. 128—90)

This invention relates to preconditioned cast-forming material of the type disclosed in my copending application Serial No. 209,701, filed May 24, 1938, now United States Patent No. 2,218,844, granted October 22, 1940.

In preparing preconditioned cast-forming material the colloidal loading or resinous binder is rendered plastic and adhesive by the incorporation of a suitable solvent and great care must be taken to avoid the use of excess solvent. If too much solvent is used, the loading is rendered too fluid, particularly if the containers are subjected to warm temperatures, in which case the loading is apt to drain or run from the fabric base and collect in a pool at the bottom of the container. On the other hand, if insufficient solvent is used, the loading is not rendered sufficiently adhesive to insure welding of contiguous layers of the cast-forming material when applied.

The principal objects of the present invention are to provide an improved cast-forming material which is not subject to the aforementioned difficulties and to provide an improved method of preparing preconditioned cast-forming material.

Further objects will be apparent from a consideration of the following description and the accompanying drawing, wherein Fig. 1 is a diagrammatic view of apparatus suitable for preparing cast-forming material in accordance with the present invention;

Fig. 2 is a top plan view of the coating device;

Fig. 3 is a perspective view of a sheet of preconditioned cast-forming material prepared in accordance with the present invention; and Fig. 4 is a perspective view, with parts broken away, of the preconditioned material packed in a hermetically sealed container.

I have observed, when a solution of a cellulose ester, such as pyroxylin, is mixed with a solution of a cellulose ether, such as ethyl cellulose, that although the two solutions exhibit some degree of compatibility, after standing the mixture separates out into two layers; that when relatively viscous solutions of the two are mixed, syneresis ultimately takes place with the formation of a cellulose ether gel; and that when a viscous solution of one is applied to a dried porous material impregnated with the other, the solvent is substantially completely absorbed and the dried material becomes plasticized, after which syneresis takes place with the formation of a gelatinous coating or integument on the surface of the impregnated material. Thus, there is a sort of migration between the two colloids.

In accordance with the present invention a sheet of suitable fabric is first impregnated with a colloidal binder preferably consisting essentially of a cellulose ester or a cellulose ether, and the impregnated sheet is then dried and cut into strips of suitable length and width, as described in Patent No. 2,218,844. The dried strips are then treated with a solution of a cellulose ether or a cellulose ester, depending upon which of the two was used to impregnate the base fabric. If a cellulose ester were used to impregnate the base fabric, then the treating solution will comprise a cellulose ether at least partially compatible with the cellulose ester and dissolved or dispersed in an organic solvent or mixture which would also dissolve the cellulose ester.

The selection of the particular type of cellulose ester is governed by the particular type of cellulose ether to be used. In any case the two should be at least partially compatible and soluble in a common solvent or mixture. The concentration of the treating solution depends upon the viscosity characteristic of the cellulose compound and in any case should be such as not only to permit the solvent component to plasticize and render adhesive the cellulose compound of the base fabric, but also to promote syneresis after a relatively short period of time. In any event care must be taken to avoid rendering the binder sufficiently fluid so that it would have a tendency to run or drain from the fabric base before syneresis takes place.

After treating the impregnated fabric as above described, the strips may be wound into rolls or folded into bundles and then packed in hermetically sealed containers. Syneresis may take place either before or after packing, depending upon such factors as the particular type of cellulose compounds selected, the concentration of the treating solution, the amount of impregnation of the base fabric, etc., but when it does take place the cellulose compound of the treating solution becomes more or less individualized, assuming the form of a gelatinous coating or integument enveloping the base fabric. The gelatinous coating constitutes, in effect, an interleaving which not only serves to prevent the plasticised cellulose compound of the base fabric from draining out, but also permits easy unwinding of the rolls. Moreover, as the two cellulose compounds are at least partially compatible, there is no tendency for the gelatinous coating to dry out as a separate layer and hence the treatment does not impair the self-welding character of the material when applied in the usual manner. On the contrary, the gelatinous tegument actually increases the adhesion and integration in the finished cast.

To illustrate what is now considered a preferred procedure, reference is made to the accompanying drawing wherein the numeral 1 represents a roll of bias-cut fabric impregnated with nitrocellulose, dried and cut into strips 8 in the manner described in Patent No. 2,218,844. The roll 1 is supported on a shaft 2 which is mounted in bearings formed in shaft-supports 4 which are suitably fixed to a bench, table or the like. The strip S is drawn about a set of tension bars or rolls 5, then to a coating or treating apparatus 6, and thence to a wind-up shaft 8 mounted in supports 10, where it is wound into rolls R of the desired length.

The coating apparatus 6 (Fig. 2) comprises a trough 11 having end walls which support bearings 12 in which the ends of an applying roll 14 are mounted. The rear wall 15 of the trough is provided with a horizontal flange or shelf 16 on which a doctor blade 18 is adjustably mounted by set screws 20. The trough is supplied with a solution of ethyl cellulose 21, as indicated in Fig. 1, and the doctor blade 18 is so adjusted, relative to the face of the roll 14, that a predetermined amount of ethyl cellulose solution is picked up and applied by the roll to the strip S.

The ethyl cellulose is preferably of a high viscosity type, such for example as the "XX high viscosity" grade, and I have found that when using this type of ethyl cellulose a suitable treating solution may comprise approximately four ounces dissolved in one gallon of a solvent mixture consisting of acetone and ethyl acetate. It is to be understood, however, that different types of ethyl cellulose may be used and that the concentration of the solution, as well as the type of solvent, may be varied throughout a wide range.

When using a solution prepared as above suggested in treating an impregnated fabric prepared in accordance with the specific example disclosed in Patent No. 2,218,844, the doctor blade may be set about 0.018 inch from the face of the roll 14, and with the parts thus adjusted sufficient ethyl cellulose solution will be applied to the strip S not only to plasticize the nitrocellulose binder 22 of the base fabric 23 (Fig. 3), but also to insure syneresis taking place with the consequent formation of a gelatinous coating 25 of ethyl cellulose which envelops the entire surface of the strip.

After the desired length of treated strip has been wound upon the shaft 10, the roll R may be removed and immediately packed in a container 30 (Fig. 4) which is then hermetically sealed. When thus packed the container may be stored indefinitely without deterioration of the preconditioned material therein.

When it is desired to use the material it is merely necessary to remove it from the container and apply it to the site of the injury. The gelatinous coating 25 of ethyl cellulose insures proper unwinding of the roll and preservation of the cellulose nitrate loading in plastic and adhesive condition. When dried the ethyl cellulose coating firmly adheres to the contiguous layers of cellulose nitrate without exhibiting a tendency to delaminate. Consequently, in a cast built up from this material the several layers or convolutions are welded together to provide an integrated structure of great strength and rigidity.

I claim:

1. The method of preparing preconditioned cast-forming material which comprises saturating a fibrous base impregnated with a cellulose compound with a treating solution comprising a different type of a cellulose compound dissolved in an organic solvent capable of dissolving the first-mentioned cellulose compound, one of the cellulose compounds being a cellulose ester and the other being a cellulose ether at least partially compatible with the cellulose ester, the treating solution being initially absorbed by the fibrous base with subsequent syneresis taking place to form a gelatinous integument of the cellulose compound of the treating solution.

2. The method of preparing preconditioned cast-forming material which comprises saturating a fibrous base impregnated with a cellulose compound with a treating solution comprising a different type of a cellulose compound dissolved in an organic solvent capable of dissolving the first-mentioned cellulose compound, one of the cellulose compounds being a nitrocellulose and the other being an ethyl cellulose at least partially compatible with said nitrocellulose, the treating solution being initially absorbed by the fibrous base with subsequent syneresis taking place to form a gelatinous integument of the cellulose compound of the treating solution.

3. The method of preparing preconditioned cast-forming material which comprises saturating a fibrous base impregnated with a cellulose ester with a treating solution comprising a cellulose ether at least partially compatible with the cellulose ester and dissolved in an organic solvent capable of dissolving said cellulose ester, the treating solution being initially absorbed by the fibrous base with subsequent syneresis taking place to individualize as a gelatinous integument the cellulose ether.

4. The method of preparing a preconditioned cast-forming material which comprises saturating a fibrous base impregnated with a nitrocellulose with a treating solution comprising an ethyl cellulose dissolved in an organic solvent capable of dissolving said nitrocellulose, the treating solution being initially absorbed by the fibrous base with subsequent syneresis taking place to form a gelatinous integument of the ethyl cellulose.

5. A preconditioned cast-forming material comprising a fibrous base carrying two different types of cellulose compounds, one of which constitutes an impregnant for said fibrous base and the other of which provides a coating developed on said fibrous base by syneresis, both cellulose compounds containing sufficient organic solvent to be rendered gelatinous, one of the cellulose compounds being a cellulose ester and the other being a cellulose ether at least partially compatible with the cellulose ester.

6. A preconditioned cast-forming material comprising a fibrous base carrying two different types of cellulose compounds, one of which constitutes an impregnant for said fibrous base and the other of which provides a coating developed on said fibrous base by syneresis, both cellulose compounds containing sufficient organic solvent to be rendered gelatinous, one of the cellulose compounds being a nitrocellulose and the other being an ethyl cellulose.

7. A preconditioned cast-forming material comprising a fibrous base impregnated with a cellulose ester and having a coating of a cellulose ether developed on the impregnated fibrous base by syneresis, the cellulose ester and ether being at least partially compatible and containing sufficient organic solvent to be rendered gelatinous.

8. A preconditioned cast-forming material comprising a fibrous base impregnated with a nitrocellulose and having a coating of an ethyl cellulose developed on the impregnated fibrous base by syneresis, both the nitrocellulose and the ethyl cellulose containing sufficient organic solvent to be rendered gelatinous.

STANLEY P. LOVELL.